Figure 1:
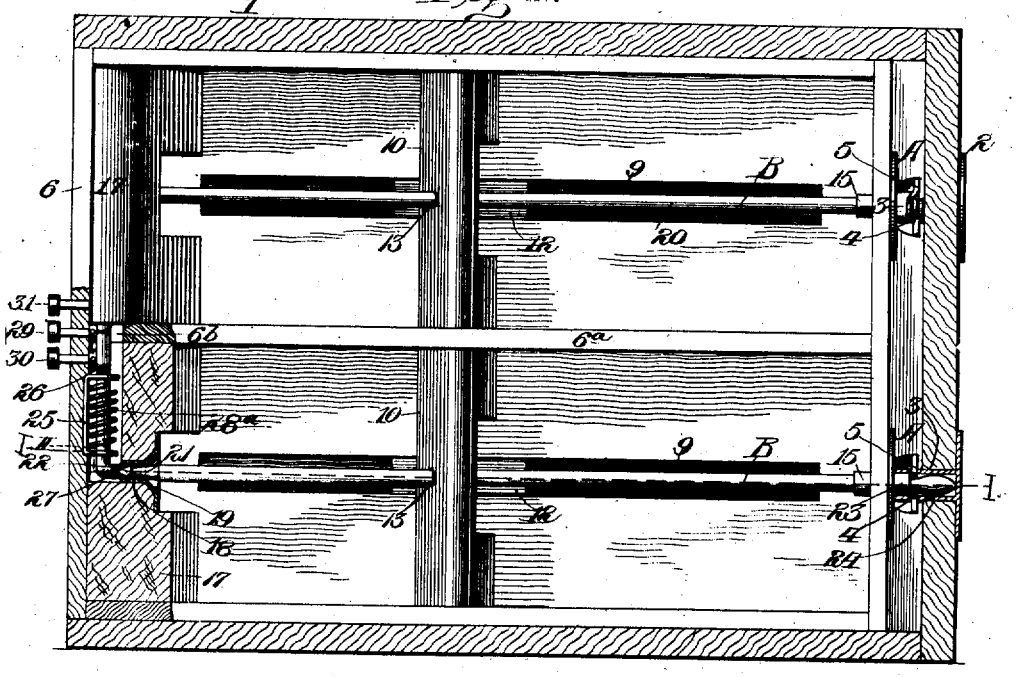

No. 12,048. Reissued Oct. 28, 1902.

C. W. SCARRITT.

CARD INDEX FILE.

(Application filed May 16, 1900.)

2 Sheets—Sheet 1.

Witnesses.
Walter B. Payne.
H. Willard Rich.

Inventor:
Charles W. Scarritt
by Church & Church
his Attorneys.

No. 12,048. Reissued Oct. 28, 1902.

C. W. SCARRITT.

CARD INDEX FILE.

(Application filed May 16, 1900.)

2 Sheets—Sheet 2.

Witnesses:

Walter B. Payne.

Willard Rich.

Inventor,

Charles W. Scarritt by Chunet & Chunet his Attorneys.

UNITED STATES PATENT OFFICE.

CHARLES W. SCARRITT, OF BELTON, MISSOURI, ASSIGNOR TO THE YAWMAN & ERBE MANUFACTURING COMPANY, OF ROCHESTER, NEW YORK, A CORPORATION.

CARD-INDEX FILE.

SPECIFICATION forming part of Reissued Letters Patent No. 12,048, dated October 28, 1902.

Original No. 638,942, dated December 12, 1899. Application for reissue filed May 16, 1900. Serial No. 16,941.

*To all whom it may concern:*

Be it known that I, CHARLES W. SCARRITT, of Belton, Cass county, Missouri, have invented certain new and useful Improvements in Card-Index Files, of which the following is a specification.

This invention relates to index-files, and more especially to that class wherein the index-cards are held in position in a drawer by means of a rod extending longitudinally through the drawer and the cards contained therein.

Patents now in force disclose constructions wherein the file-rod extends through the perforation in the body of each card. This construction is objectionable, because to remove the first or foremost card it is necessary after pulling the drawer open to pull the rod forward until it is withdrawn from all the cards. To obviate this objection, other patents exist which embrace a flattened rod extending through the enlargement of a narrow slot in the lower edge of each card, so that by turning the flattened rod to a vertical position the cards can be removed from the rod without longitudinal movement of the latter, the cards being locked in position when the rod is turned to a horizontal position, because its longest diameter is then transverse of and cannot pass through said narrow slot. This construction is objectionable, because the cards are not held reliably by the rod under careless handling of the drawer when withdrawn. Theoretically the connection is perfect, but practically it is not.

The primary object of my invention is to produce a card-index file which will possess the advantageous features of the two types referred to with the objectionable features of neither—that is to say, a device which will permit the inversion of the drawer, if desired, without any possibility of dislocating the cards, or, on the other hand, will permit any or all of the cards to be removed from the drawer or additional cards inserted without requiring the file-rod to be pulled forward through the drawer or rotated.

A further object is to provide a device of this character which possesses the desirable features of simplicity, strength, durability, and cheapness of construction.

To these ends the invention consists in certain novel and peculiar features of construction and combinations of parts, as will be hereinafter described and claimed, and in order that it may be fully understood reference is to be had to the accompanying drawings, in which—

Figure 2:
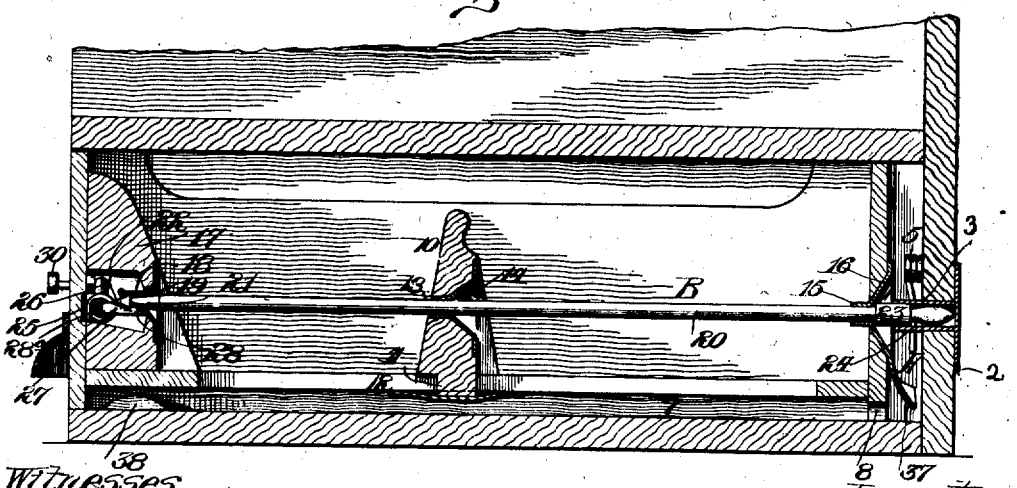
Figure 3:
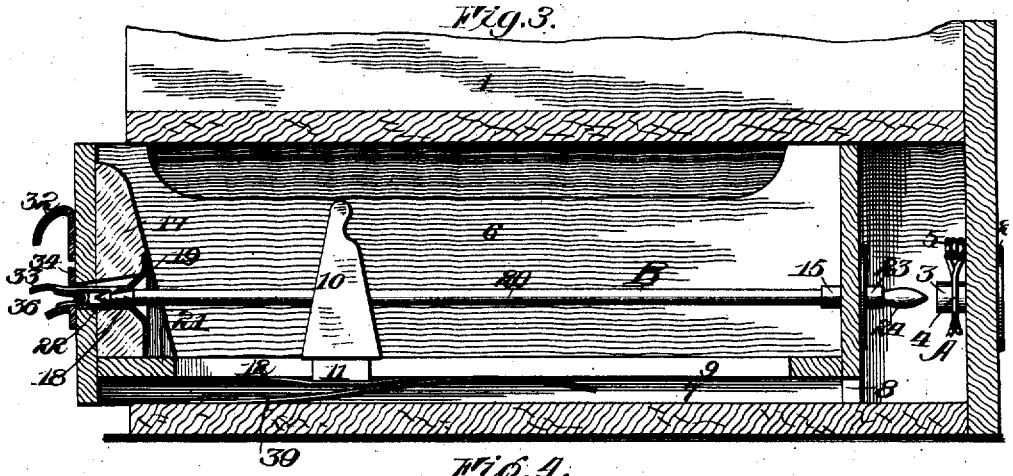
Figure 4:
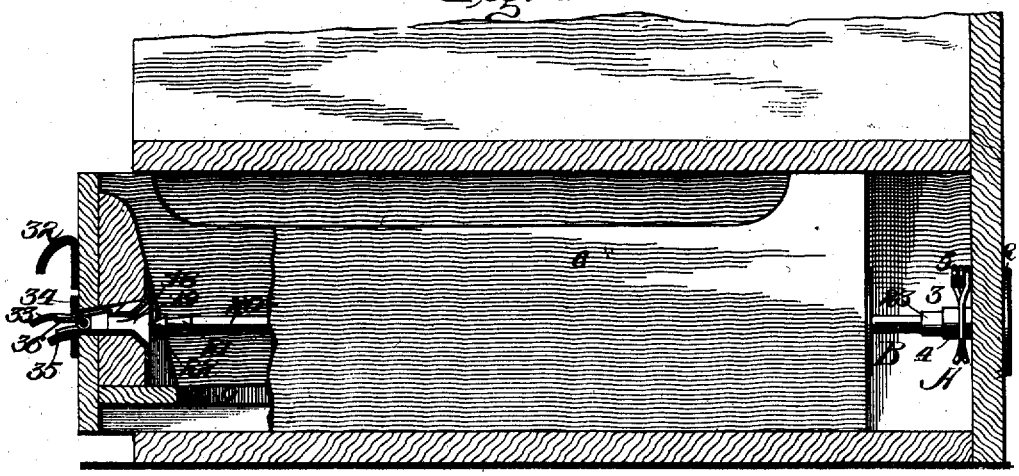
Figure 5:
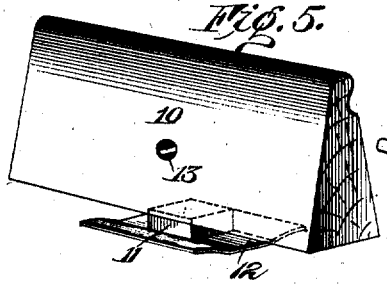
Figure 6:
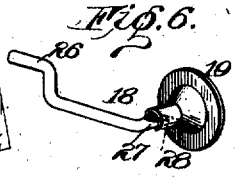
Figure 7:
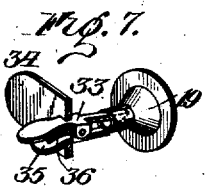

Figure 1 represents in horizontal section a cabinet containing a double-drawer card-index file constructed in accordance with my invention, said drawer being shown partly in horizontal section. Fig. 2 is a vertical section taken on the irregular dotted lines I I of Fig. 1. Fig. 3 is a vertical section showing my single-drawer construction. Fig. 4 is a view substantially similar to Fig. 3, but showing the drawer and file-rod in a different relation. Fig. 5 is a detail perspective view of the card-follower. Fig. 6 is a detail perspective view of the file-rod-locking mechanism of the double-drawer construction. Fig. 7 is a similar view of the file-rod-locking mechanism of the single-drawer construction.

Referring to said drawings in detail, 1 designates a cabinet or box of the usual or any preferred type, and secured to the box is a locking device, (designated in a general way by A,) said locking device comprising a plate 2, provided with a tubular arm or sleeve 3, projecting forwardly into the drawer-chamber and formed within said chamber with opposite slots 4, through which extend the arms of a spring 5, the tension of said arms holding them reliably in said slots at all times. There will be in practice a locking device of the above type for and in longitudinal alinement with each file-rod.

6 designates a drawer to slide in the drawer-opening of the cabinet. The bottom of the drawer is elevated sufficiently above the plane on which it slides—viz., the bottom of the drawer-opening—to provide a chamber 7, and said chamber communicates with a registering notch 8 in the lower edge of the back wall of the drawer for a purpose which will hereinafter appear, and the bottom of each drawer or each compartment of a drawer is formed with a central longitudinal slot 9.

10 designates the sliding card-follower, of approximately isosceles-triangular form in cross-section and formed with a rectangular neck 11, depending snugly through the registering slot 9 and provided at its under side with the spring-plate 12 of greater width than said slot and pressing firmly up against the bottom of the drawer, so as to reliably hold the follower at any point to which it may be adjusted, it being understood that this follower is adapted as a support for the index-cards, (not shown,) being adjusted rearwardly to accommodate an increase in the number of the cards in the manner common to devices of this class. The follower is provided with an opening 13 in longitudinal alinement with the tubular arm of the locking device, said opening being in the form of a metallic tube having a flaring mouth 14 at its rear side. The front end of the tube is also flared slightly, as is also the front end of the tubular arm of the locking device and the similar tube 15, secured in the rear wall of the drawer and provided with a similar rearwardly-flaring mouth 16. The front ends of these tubes are thus flared or internally beveled for a purpose which will hereinafter appear.

17 designates a triangular block which is secured in the front end of each drawer or drawer-compartment, and 18 a slotted tube carried by said block and formed with a flaring mouth 19, said tube being arranged in longitudinal alinement with the tubes 13 and 15 and the tubular arm 3 of the locking device.

In the double-drawer construction the slot of the tube 18 is vertically below the center of the tube, while in the single-drawer construction it is vertically above the center of the tube.

B designates in a general way the file-rod, the same consisting of the cylindrical card-supporting spindle 20, the diametrically-reduced neck portion 21 near its front end, and the conical head 22 forward of said neck portion. Near its rear end the rod is formed with an enlargement or collar 23 and rearward of the same terminates in an approximately acorn-shaped head 24, said head at its point of connection with the enlargement being of less diameter than the latter and occupying a position when the rod is anchored to the cabinet by the locking device opposite the slots in the tubular arm 3, with the arms of the spring 5 held tightly in said slots and against the reduced neck portion of the head 24 with considerable tension, so as to prevent any possibility of the rod being disengaged from the locking device except by a direct longitudinal application of power, as hereinafter referred to. The arms of said spring, as will be readily understood by reference to the drawings, extend through the slots in the tubular arm 3 and intersect the path of movement of the acorn-shaped head 24, so that as said head is forced rearward into the tubular arm it will, acting as a wedge, spring said arms outwardly, the arms by their own tension resuming their original positions and embracing tightly the narrow neck portion of the head 24 as said rod reaches its limit of movement in the direction indicated. On the other hand, when the file-rod is pulled forward in a manner hereinafter explained the acorn-shaped head acts as a wedge to spring the arms apart until its release is effected. The file-rod extends forwardly from the locking device through the tubes 15, 13, and 18 when the drawer is closed, and the enlargement 23 acts to limit the closing movement of the drawer, and thereby protect the locking device from injury which might result from forcibly closing the drawer if the inward movement of the latter was not limited.

As the double drawer is provided with a file-rod for each compartment, it is desirable to manipulate or release said file-rods simultaneously or independently. Therefore I have provided the following construction—that is to say, a bearing-bracket 25 is secured to the front wall of each drawer compartment and projects into a recess formed in the block 17 to receive it, and journaled in said recess is a rock-shaft provided at its inner end with an upwardly-extending crank-arm 26 and at its outer end with the rearwardly-extending crank-arm 27, said crank-arm being formed with a ratchet-head 28, adapted to engage in behind the conical head of the corresponding file-rod, said ratchet-headed crank-arm being adapted to play up and down through the slot of the guide-sleeve 18, being forced downward through said slot as it strikes the conical head 22 of the file-rod and springing up behind said head under the action of the coil-spring 28[a], said spring encircling the shaft and secured thereto at one end and bearing at its opposite end against the bearing-bracket 25. The crank-arms 26 of the rock-shafts come together in an opening or recess 6[b], formed in the front end of the partition 6[a] of the double drawer, and under the pressure of said springs conjointly the push-button 29, engaging the said arms 26, is forced and held outwardly normally, as shown in Fig. 1. At opposite sides of the push-button 29 are the similar push-buttons 30 31, one being adapted for engagment with the crank-arm 26 of one shaft and the other with the crank-arm 26 of the companion shaft. By this arrangement it is obvious that the operator by pushing inward upon the push-button 30 or 31 can rotate the rock-shaft and cause its headed arm to release the corresponding file-rod, so that the drawer can be opened, if desired, without withdrawing that particular file-rod with it. On the other hand, if it be desired to open the drawer, leaving both file-rods anchored to the cabinet at their rear ends, it can be accomplished by simply pressing the push-button 29 rearward, this operation causing the simultaneous rotation of the rock-shafts and the disengagement of their headed arms 27 with the heads of the file-rods, as will be readily understood. To effect the opening of the drawer and leave the file-rod anchored to the cabinet, it is of course necessary to maintain the pressure upon the push-button until the drawer has been opened about an eighth of an inch to prevent any possibility of the reëngagement of the headed crank-arms with the heads of the rods.

If it be desired to withdraw the file-rods with the drawer, it is only necessary for the operator to grasp the handle 32 and pull the drawer open. In this operation the engagement of the arrow-headed arms with the heads of the file-rods is not disturbed, and in this relation the power applied to open the drawer is transferred by the acorn-shaped heads 24 of the rods to the spring-arms of the locking devices, the latter being of course compelled to yield under this action and release the heads.

In the single-drawer construction in lieu of the cranked rock-shaft I by preference employ its mechanical equivalent in the shape of a ratchet-headed lever 33, this lever projecting through the front wall of the drawer and into the slot of the sleeve 18, through which it is adapted to vertically play in engaging or releasing the head of the file-rod. This lever is pivoted to and also extends through the escutcheon-plate 34, secured to the front of the drawer and provided with a finger-grip 35, a spring 36, encircling the pivot connecting the escutcheon-plate and the lever, having its opposite ends bearing against the finger-grip of the escutcheon-plate and the thumb-piece or handle of the lever, so as to hold the headed end of the latter with a yielding pressure in engagement with the head of the file-rod, as shown clearly in Fig. 3, said lever being disengaged from the file-rod by downward pressure applied upon its outer end, as will be readily understood.

In Fig. 3 the drawer is shown as partly open and the file-rod disconnected from the cabinet. When totally withdrawn, it is obvious that the drawer may be inverted or placed in any position without any possibility of the index-cards being disarranged or dislocated.

In Fig. 4 the drawer is also partly withdrawn; but the file-rod remains anchored to the cabinet, so that when the drawer is opened a sufficient distance the index-cards are perfectly free and may be removed or replaced at will. Supposing that there be only a few cards in the drawer and those at the front end, it is obvious that by opening the drawer just a slight distance the cards may be slipped off the front end of the rod and when replaced will be rethreaded upon the rod by simply closing the drawer, because the rod is maintained in the proper position with relation to the card-holes by the alined guide-sleeves hereinbefore referred to. In this connection it will be observed that by internally beveling the front ends of the guide-sleeves 13 and 15 the head 22 of the file-rod is prevented from catching on the front end of either tube as the drawer is opened with the rod anchored to the cabinet and that the beveled mouths of said tubes and of the tube 18 make it unimportant whether the rod is exactly centered when replacing the drawer in the cabinet. Furthermore, the internally-beveled front end of the tubular arm or sleeve of the locking device A makes positive and reliable the reëntrance of the head 24 in said arm or sleeve as the drawer carrying the rod is closed.

When the drawer is entirely removed from the cabinet and the file-rod is supported solely by the locking mechanism of the cabinet, it is obvious that the front end of the rod would tend to sag, particularly in the case of a very long drawer and where the rear end of the rod did not fit any too snugly in the tubular arm of the locking device. To avoid any trouble or annoyance on this score and to save the time which would be lost by centering the rod by hand, I provide the flaring mouth of the sleeve 15 with a guide extension 37, arranged with its lower end in about the same plane as the top of the block 38, secured to the bottom of the cabinet in line with the drawer-opening 8, but near the front end of the cabinet in order to support the front end of the rod (in case it sags so far) sufficiently high for its positive and reliable engagement with guide extension 37 as the drawer is fitted into the cabinet, the extension in the subsequent closing of the drawer insuring the passage of the rod through the sleeve 15, as will be readily understood.

As a substitute for the block-and-guide extension the spring-support may be employed, this spring 39, (see Fig. 3,) like the block, not preventing the opening of the drawer, because it passes freely through the door-opening 8. As the drawer is withdrawn from the cabinet the spring rises under its own tension and holds the file-rod substantially in position to reënter the sleeve 15 as the drawer is closed, the latter in its closing movement forcing the spring to the inoperative position shown in Fig. 3.

From the above description it will be apparent that I have produced a card-index file which embodies the features of advantage enumerated in the statement of invention and which is of simple, strong, durable, and cheap construction, and it is to be understood that while I have illustrated and described the preferred embodiment of my invention I reserve the right to make all changes which properly fall within its spirit and scope.

I claim as my invention—

1. A card-index file, comprising a cabinet, a drawer therein, and a file-rod carried by said drawer and detachably connected to the cabinet, for the purpose set forth.

2. A card-index file, comprising a cabinet, a drawer therein, a locking device attached to the cabinet and embodying a spring, and a file-rod carried by the drawer and provided with an approximately acorn-shaped head with its reduced or neck portion clasped firmly by said spring, substantially as described.

3. A card-index file, comprising a cabinet, a drawer therein, a locking device attached to the cabinet, consisting of a tubular arm or sleeve and a spring, and a file-rod carried by the drawer and provided with a substantially acorn-shaped head to enter said arm or sleeve and have its neck portion embraced by said spring, substantially as described.

4. A card-index file, comprising a cabinet, a drawer therein, and a file-rod anchored to said cabinet and detachably connected to said drawer, substantially as described.

5. A card-index file, comprising a cabinet, a drawer, a ratchet-headed rock arm or lever carried by the drawer, and a file-rod connected at its rear end to the cabinet and extending through said drawer and provided at its front end with a head engaged by said arm or lever, substantially as described.

6. A card-index file, comprising a cabinet, a drawer, a ratchet-headed rock-arm or lever carried by the drawer, a file-rod connected at its rear end to the cabinet and extending through said drawer and provided at its front end with a head engaged by said arm or lever, and a push-button to effect the disconnection of said arm or lever from the head of said file-rod, substantially as described.

7. A card-index file, comprising a cabinet, a double drawer therein, a file-rod extending through each compartment of the drawer and anchored at its rear end to the cabinet and provided at its front end with a head, a rock shaft or lever suitably journaled in each compartment of the drawer and provided with crank-arms at their inner and outer ends, the crank-arms at the outer ends being formed with ratchet-heads, springs to hold said ratchet-headed arms in engagement with the heads of the file-rods, a push-button arranged to engage the inner crank-arm of each shaft, and a push-button arranged to simultaneously engage the inner crank-arms of both of said shafts, substantially as described.

8. A card-index file, comprising a cabinet, a drawer therein, and a file-rod extending longitudinally through the drawer and detachably connected to the same at its front end and to the cabinet at its rear end, substantially as described.

9. A card-index file, comprising a cabinet, a drawer therein, a card-follower in said drawer, guide-sleeves carried by said drawer and said follower and provided with rearwardly-flaring mouths, and a file-rod anchored at its rear end to the cabinet and extending forward through said sleeves and connected at its front end to the drawer, substantially as described.

10. A card-index file, comprising a cabinet, a support projecting upward from the bottom of the cabinet near its front end, a drawer in the cabinet, a file-rod anchored at its rear end to the cabinet and extending forward into the drawer and adapted when the drawer is removed to sag down at its front end toward said support, and a flaring-mouthed guide-sleeve in the rear end of the drawer, provided with a guide extension, substantially as described.

11. A card-index file, comprising a cabinet, a slotted drawer therein, a file-rod extending through the drawer and anchored at its opposite ends to the cabinet and the drawer, and a card-follower mounted in the drawer upon said rod and provided with a neck portion engaging a slot of the drawer and with a spring-plate bearing up against the bottom of the drawer, substantially as described.

12. A card-index file, comprising a cabinet or casing, a removable drawer or receptacle therein, a file-rod carried by the drawer extending into the latter and removable from the rear end of the drawer only, when the latter is removed from the cabinet, and a locking device in the drawer movable relatively to the rod and arranged to detachably engage the latter when inserted from the rear of the drawer.

13. A card-index file comprising a cabinet or casing, a removable drawer therein, a file-rod carried by the drawer and removable only from the rear end thereof, and a locking device arranged at the outer end of the drawer accessible from the front and automatically engaging the file-rod when inserted therein from the rear of the drawer.

14. A card-index file comprising a cabinet, a drawer or receptacle and a file-rod carried by the drawer and removable from the rear thereof, and automatic locking devices on the drawer for engaging the rod to lock it having an operating portion accessible from the front end of the drawer.

15. A card-index file comprising a cabinet, a drawer or receptacle and a file-rod carried by the drawer and removable from the rear thereof, locking devices at the forward end of the drawer engaging the rod and having an operating portion accessible from the exterior of the front of the drawer for releasing the rod.

CHARLES W. SCARRITT.

Witnesses:
FREDERICK F. CHURCH,
CARL F. LOMB.